UNITED STATES PATENT OFFICE.

JOHANN KASSEKER, OF ALTWASSER, GERMANY, ASSIGNOR TO MESSRS. SCHMIDT, KASSEKER & CO., OF ALTWASSER, GERMANY.

INK FOR CERAMIC TRANSFER-PICTURES.

971,280.      Specification of Letters Patent.      Patented Sept. 27, 1910.

No Drawing.      Application filed November 1, 1909. Serial No. 525,709.

*To all whom it may concern:*

Be it known that I, JOHANN KASSEKER, a subject of the King of Prussia, and residing at Altwasser, Silesia, German Empire, have invented certain new and useful Improvements in Inks for Ceramic Transfer-Pictures, of which the following is a specification.

My invention relates to an ink for ceramic purposes, and consists in substituting, in the vehicle, for the ordinary linseed-oil varnish (which when manufacturing by boiling with minium in ceramic ink making contains, as is well known, at most from 5-10% of the latter), a mass which is prepared by saturating as completely as possible linseed-oil with minium (or other suitable lead compounds) so that some 50% of the latter is contained.

In consequence of the high percentage of lead in the ink, the addition of a special glass flux is rendered unnecessary, whereby numerous advantages are attained, as will be hereinafter specified.

In manufacturing the new inks I proceed substantially in the following manner:—Into a suitable vessel I put linseed-oil, with somewhat more than an equal quantity by weight of minium (red-lead) or other suitable lead compounds, and boil it as long as it absorbs the same, *i. e.* until it is completely saturated therewith. This can be ascertained externally by there remaining but a small deposit of minium at the bottom of the vessel after prolonged boiling. The linseed-oil itself usually assumes a darker color, and on stiffening in the cold displays a resinous character, similar to colophony. After saturation the other necessary non-drying thinning ingredients, such as animal fat, salad oil, lavender oil, aniseed oil, oil of cloves, etc., are added, for the purpose of sufficiently thinning down the mass, the amount of thinning agent depending upon whether a "tough" or viscous, or more liquid ink is desired, such amount usually varying between 10 and 20 per cent. Hereupon the coloring matters, which are solely metallic oxids, are added to the mass, and the boiling continued while the mass is being constantly agitated, until the entire material is uniformly mingled, when the ink may be regarded as ready for use.

Owing to the high percentage of lead in the ink, the latter will adhere extremely firmly on being burned into the ceramic ware, without the ink—as hitherto necessary and as above mentioned—requiring a fused flux to be added to it. With prior inks from 3-5 parts flux must be added for each 1 part coloring matter, so that the percentage of the latter in the mass is relatively small. For this reason the colors frequently do not stand out with sufficient sharpness. Owing to the absence of the fluxes in my process, an ink is obtained which possesses a very high percentage of the actual pigments and thus gives extremely clear and full colored pictures. As a consequence a much larger number of transfers can also be taken from the plates. A further advantage, due to fluxes being dispensed with, is that the ink maintains its uniform condition unaltered for an exceedingly long time, whereas with prior inks, in which the flux is merely mechanically mixed, the ink frequently becomes "cheesy", or the flux forms a sediment. The chief advantage of the new ink, however, is that by means of the same transfer pictures can be readily produced either by autotypy or heliography, and with the same sharpness as in the case of lithography. This has hitherto been extremely difficult, in fact practically impossible, even when a paper is used which has been provided with a coating insoluble in water. For the high percentage of glass flux merely mechanically mingled with the ink, even when in an exceedingly fine state of division, operates with a grinding action like emery on the rotation of the printing roller and damages the fine gelatin films, whereby the attainment of sharp pictures and especially a large number thereof, has been impossible.

Having thus described my invention, I declare that what I claim as new and desire to secure by Letters Patent of the United States is—

1. An ink for ceramic transfer pictures, comprising a non-drying thinning liquid, a pigment, and linseed oil substantially saturated with an equal quantity of a lead compound.

2. An ink for ceramic transfer pictures, comprising a non-drying thinning liquid, a pigment, and linseed oil substantially saturated with an equal quantity of minium.

In testimony whereof I affix my signature in presence of two witnesses.

JOHANN KASSEKER.

Witnesses:
SIEGFRIED LUSTIG,
ADOLF SCHMIDT.